(12) United States Patent
Davis et al.

(10) Patent No.: US 8,250,901 B2
(45) Date of Patent: Aug. 28, 2012

(54) SYSTEM AND METHOD FOR CALIBRATING A ROTARY ABSOLUTE POSITION SENSOR

(75) Inventors: Donald R. Davis, Brighton, MI (US); Frank Noble Permenter, Webster, TX (US); Nicolaus A Radford, Houston, TX (US)

(73) Assignees: GM Global Technology Operations LLC, Detroit, MI (US); Oceaneering International, Inc., Webster, TX (US)

( * ) Notice: Subject to any disclaimer, the term of this patent is extended or adjusted under 35 U.S.C. 154(b) by 245 days.

(21) Appl. No.: 12/564,092

(22) Filed: Sep. 22, 2009

(65) Prior Publication Data
US 2011/0067479 A1 Mar. 24, 2011

(51) Int. Cl.
*G01C 17/38* (2006.01)
(52) U.S. Cl. .................................................. 73/1.75
(58) Field of Classification Search .................. None
See application file for complete search history.

(56) References Cited

U.S. PATENT DOCUMENTS

| | | | |
|---|---|---|---|
| 7,288,931 B2 * | 10/2007 | Granig et al. | 324/202 |
| 2010/0007340 A1 * | 1/2010 | Kaita et al. | 324/207.25 |

FOREIGN PATENT DOCUMENTS

| | | |
|---|---|---|
| JP | 3117580 | 5/1991 |
| JP | 3170011 A | 7/1991 |
| JP | 2007327770 A | 12/2007 |

OTHER PUBLICATIONS http://robotics.nasa.gov/courses/fall2002/event/oct1/NASA_Robotics_20021001.htm.

* cited by examiner

*Primary Examiner* — Robert R Raevis
(74) *Attorney, Agent, or Firm* — Quinn Law Group, PLLC

(57) ABSTRACT

A system includes a rotary device, a rotary absolute position (RAP) sensor generating encoded pairs of voltage signals describing positional data of the rotary device, a host machine, and an algorithm. The algorithm calculates calibration parameters usable to determine an absolute position of the rotary device using the encoded pairs, and is adapted for linearly-mapping an ellipse defined by the encoded pairs to thereby calculate the calibration parameters. A method of calibrating the RAP sensor includes measuring the rotary position as encoded pairs of voltage signals, linearly-mapping an ellipse defined by the encoded pairs to thereby calculate the calibration parameters, and calculating an absolute position of the rotary device using the calibration parameters. The calibration parameters include a positive definite matrix (A) and a center point (q) of the ellipse. The voltage signals may include an encoded sine and cosine of a rotary angle of the rotary device.

12 Claims, 3 Drawing Sheets

SYSTEM AND METHOD FOR CALIBRATING A ROTARY ABSOLUTE POSITION SENSOR

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to a system and a method for calibrating an absolute position sensor for a rotary actuator or other rotary device.

BACKGROUND OF THE INVENTION

Robots are automated or autonomous devices that are able to manipulate objects using a series of links, which in turn are interconnected via articulations or compliant robotic joints. Each joint in a typical robot represents an independent control variable, also referred to as a degree of freedom (DOF). End-effectors are the particular links used for performing a task at hand, e.g., grasping a work tool or other object. Therefore, precise motion control of a robot may be organized by the level of task specification: object level control, i.e., the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots in particular have an approximately human structure or appearance and/or functionality, whether a full body, a torso, and/or one or more appendages, with the required structural complexity of the humanoid robot being largely dependent upon the nature of the work task being performed. The use of humanoid robots may be preferred where direct interaction is required with objects, tools, or systems that are specifically intended for human use. Due to the wide spectrum of potential work tasks that may be expected of a humanoid robot, different control modes may be simultaneously required. For example, precise control must be applied within the different control spaces noted above, as well as over an applied torque, force, or resultant joint motion. Such humanoid robots, as well as other mechanical, electrical, or electro-mechanical systems, typically utilize rotary actuators such as motors, series elastic actuators, or other devices to achieve a desired rotational output within the system. Accurate positional information of such rotary actuators is required to ensure precise control of the actuators and the system components controlled thereby.

SUMMARY OF THE INVENTION

Accordingly, a rotary sensor calibration system and method are provided herein that quickly and robustly calibrates a rotary absolute position (RAP) sensor having encoded voltage outputs, such as sine and cosine values of a measured rotary angle or position of a rotary actuator. RAP sensors may be used in conjunction with a rotary actuator or other rotary device within any mechanical, electrical, or electro-mechanical system, including but not limited to a humanoid robot of the type set forth herein. Proper calibration of a RAP sensor is required due to the inherent imprecision or error in determining an absolute position or angular state of a rotary actuator, e.g., due to errors or noise, sensor mounting imprecision, analog-to-digital (A-to-D) conversion errors, or other factors.

The method includes taking a series of position-based voltage measurements using the RAP sensor(s), and then feeding these voltage values to a host machine or calibration module for recording therein. The voltage data is then fitted to an ellipse. From the fitted ellipse, a linear mapping process is conducted between the sensor outputs and the sine and cosine of the angle measured by the sensor to determine a set of calibration data for the sensors. Real-time measured data can be used thereafter in conjunction with the calibration data to determine an absolute position of a rotary device or any rotatable portion thereof. Such measurements may be used, by way of example, for torque control and positioning of a compliant robotic joint, e.g., an upper arm joint or shoulder of a 42+ degree of freedom (DOF) humanoid robot.

In particular, a system is provided herein that includes a rotary device, a rotary absolute position (RAP) sensor for generating encoded pairs of voltage signals describing positional data of the rotary device, a host machine, and an algorithm. The algorithm calculates calibration parameters for determining an absolute position of the rotary device using the encoded pairs of voltage signals, and is adapted for linearly-mapping an ellipse defined by the encoded pairs of voltage signals to thereby calculate the calibration parameters.

The encoded pair of voltage signals may include a first voltage signal encoding the cosine of the rotary angle, and a second voltage signal encoding the sine of the rotary angle. In one embodiment, the robotic joint is configured as an upper arm joint of the humanoid robot. In another embodiment, each of a pair of RAP sensors is positioned on opposite sides of a spring portion of a rotary actuator configured as a series elastic actuator (SEA), with the pair of RAP sensors adapted for measuring the rotary position before and after the spring portion of the SEA.

A method is also provided for calibrating the RAP sensor noted above. The method includes measuring the rotary position as encoded pairs of voltage signals using the RAP sensor, linearly-mapping an ellipse defined by the encoded pairs of voltage signals to thereby calculate calibration parameters suitable for calibrating the RAP sensor using a host machine, and calculating an absolute position of the rotary device using the calibration parameters.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
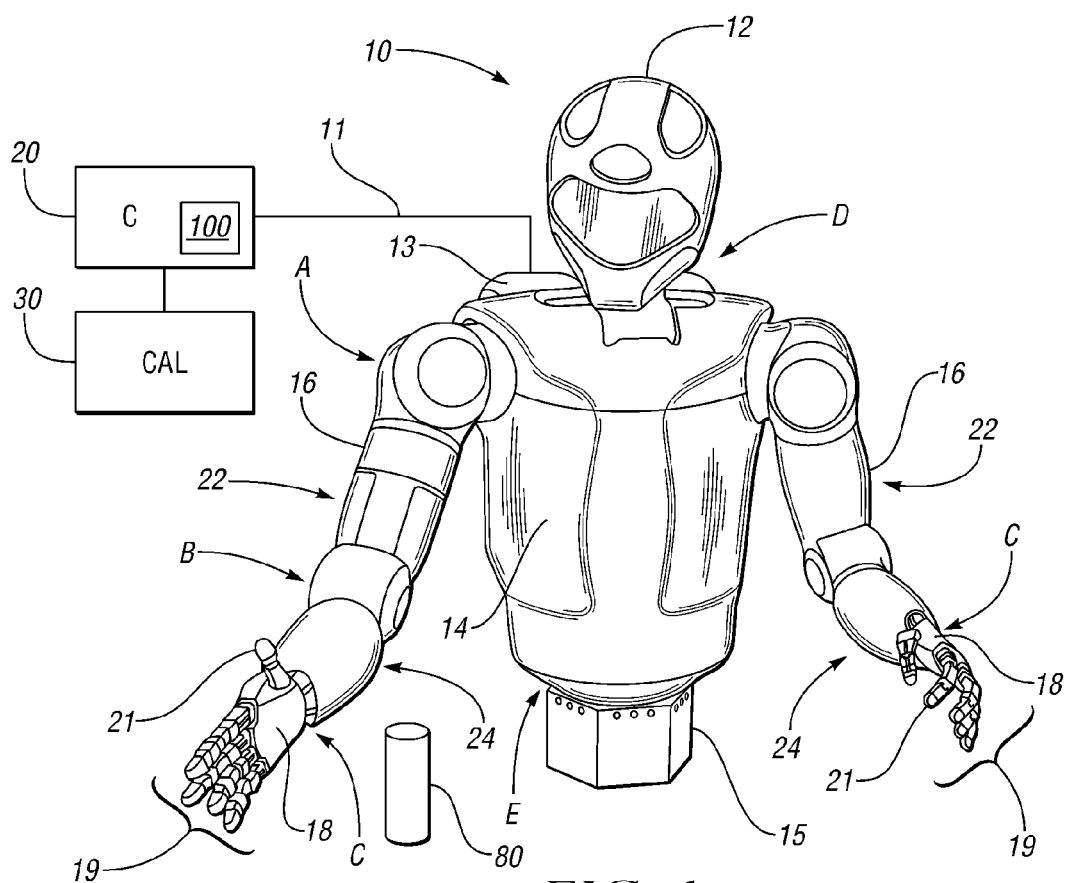
FIG. 1 is a schematic perspective illustration of a system in the form of a dexterous humanoid robot having a rotary device usable with the system and method of the present invention.

With reference to the drawings, wherein like reference numbers refer to the same or similar components throughout the several views, FIG. 1 shows a dexterous humanoid robot 10 controllable via a distributed control system or controller (C) 20. The robot 10 includes one or more rotary devices, e.g., motors, links, etc., which in one embodiment are configured as part of a series elastic actuator (SEA) 26 (see FIG. 2). However, any rotary device may be used in conjunction with the method described herein. The rotary device may be part of a highly complex robotic system of the type shown in FIG. 1, or part of a simple or base-level system, as will be understood by those of ordinary skill in the art.

The robot 10 is adapted to perform one or more autonomous tasks with multiple degrees of freedom (DOF). According to one embodiment, the robot 10 is configured with a plurality of independently and interdependently-moveable compliant robotic joints, such as but not limited to a shoulder joint, the position of which is generally indicated by arrow A, as well as an elbow joint (arrow B), a wrist joint (arrow C), a neck joint (arrow D), a waist joint (arrow E), and various finger joints (arrow F) positioned between the phalanges of each robotic finger 19. Depending on task complexity, the robot 10 may move with over 42 DOF. At least one of the robotic joints contains and is internally-driven by one or more rotary devices having a rotary position or angle that are measurable, and that are used by the algorithm 100 as set forth below.

The humanoid robot 10 may include a head 12, torso 14, waist 15, arms 16 each having an upper portion 22 and a lower portion 24, hands 18, fingers 19, and thumbs 21, with the various joints noted above being disposed within or therebetween. The robot 10 may also include a task-suitable fixture or base (not shown) such as legs, treads, or another moveable or fixed base depending on the particular application or intended use of the robot. A power supply 13 may be integrally-mounted or attached to the robot 10, e.g., a rechargeable battery pack integrated with or worn on the back of the torso 14, or another suitable energy supply connected to the robot directly or via electrical cabling, to provide sufficient electrical energy to the various joints for movement of the same.

The controller 20 provides precise motion control of the robot 10, including control over the fine and gross movements needed for manipulating a work piece, tool, or other object 80 that may be grasped by the fingers 19 and thumb 21 of one or more hands 18. The controller 20 is able to independently control each robotic joint in isolation from the other joints, as well as interdependently control a number of the joints to fully coordinate the actions of the multiple joints in performing a relatively complex work task.

Figure 2:
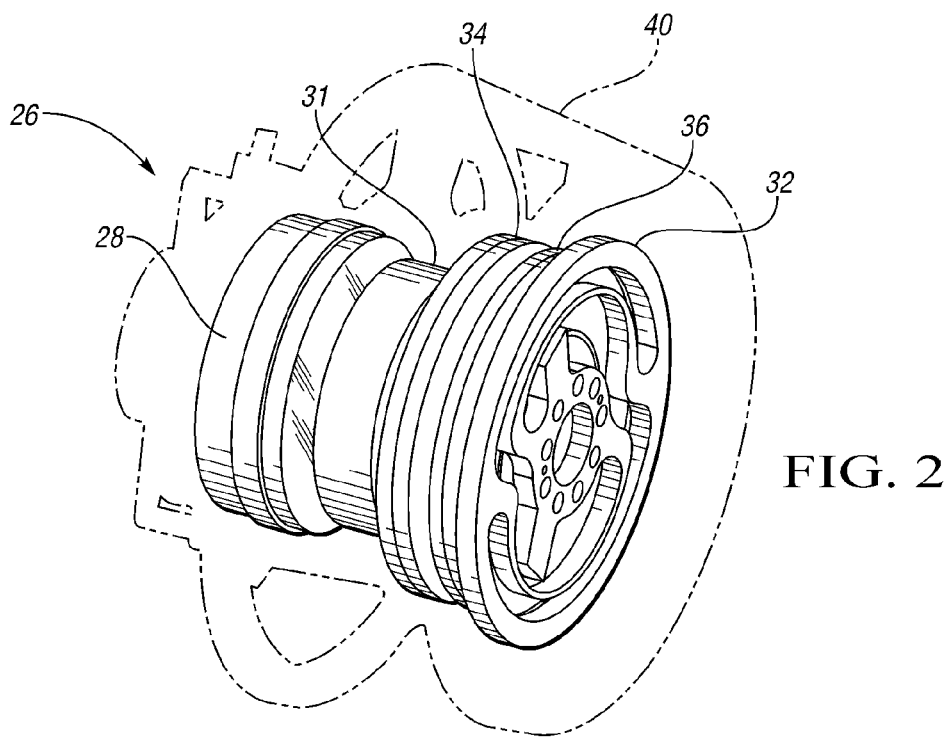
FIG. 2 is a schematic perspective illustration of an exemplary rotary device having rotary absolute position (RAP) sensors that may be calibrated in accordance with the present invention.
Figure 3:
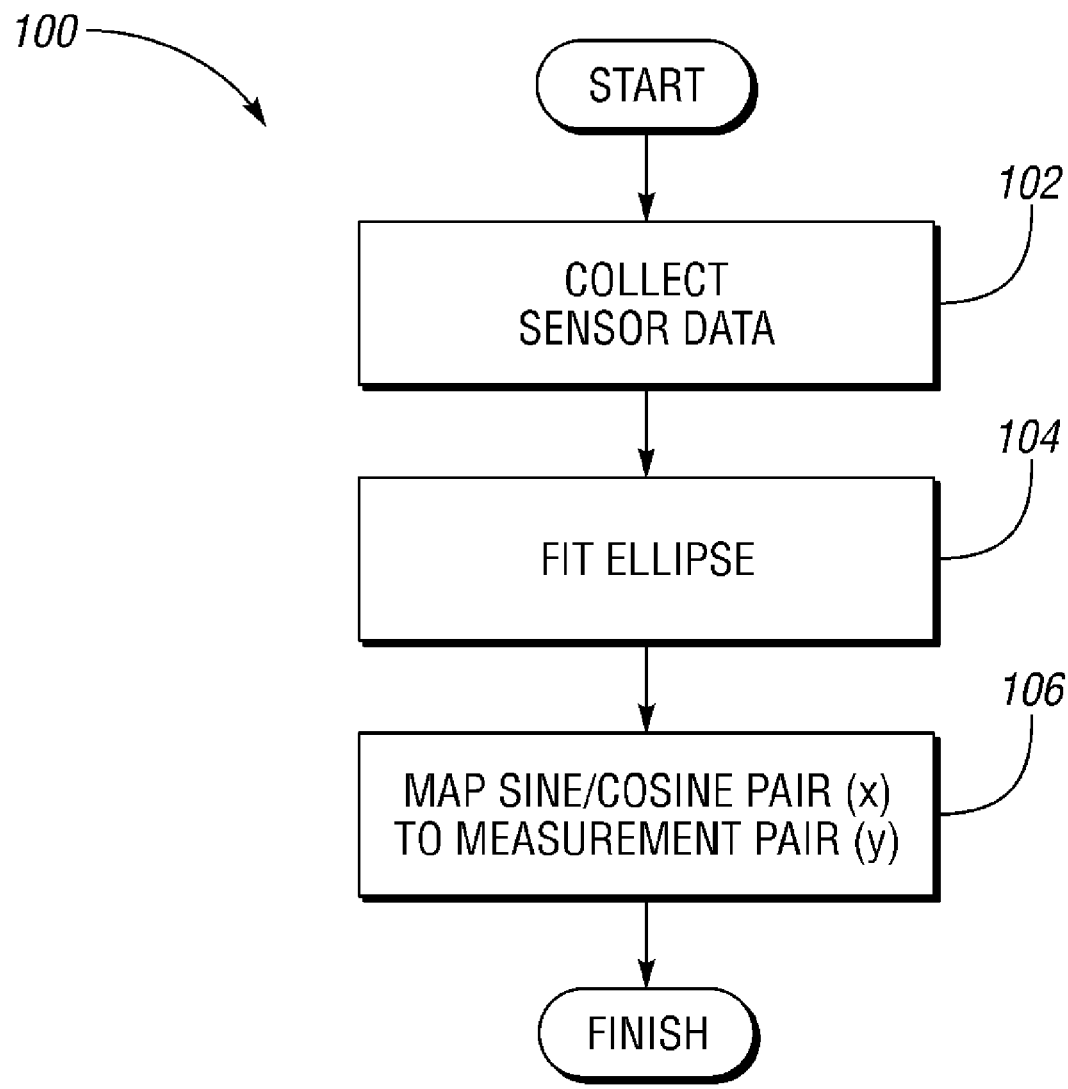
FIG. 3. is a flow chart describing a method of calibrating a RAP sensor.

Within the scope of the present invention, the robotic system also includes a calibration module (CAL) 30, i.e., a host computer, server, or other computing device configured for calibrating one or more rotary absolute position (RAP) sensors 34, 36 (see FIG. 2) via a sensor calibration algorithm 100 (see FIG. 3). Algorithm 100 allows the absolute rotary angle or position of a rotary actuator to be determined at all times, thereby ensuring proper torque and position control of the robot 10 as it executes a particular automated task sequence. Moreover, by executing the algorithm 100 as set forth below, one may achieve robust sensor calibration irrespective of how the raw sensor data is distributed, thus simplifying data collection.

Referring to FIG. 2, a rotary device 26 is shown in a cross-sectional side view. The rotary device according to one embodiment may be a series elastic actuator (SEA) having a housing 40, however the specific nature and construction of the rotary device is not so limited. That is, within the intended scope of the invention any rotatable device, be it a motor, linkage, pivot, or any other rotary device, whether configured as an actuator or acted on thereby, can be used in conjunction with the method and system as set forth herein.

In the particular embodiment shown in FIG. 2, the rotary device 26 is configured as an SEA that includes a motor 28 that rotates about an axis in response to an input torque, an output member 31 that is driven by the motor, and a spring 32. The RAP sensors 34, 36 are adapted for measuring or determining data describing a value of a desired portion of the rotary device 26, such as the motor 28 and spring 32, and then encoding output signals that are ultimately used by the calibration module 30 of FIG. 1. The encoded data may be encoded raw sine and cosine data usable by the algorithm 100, which will now be described with reference to FIG. 3.

Referring to FIG. 3 in conjunction with FIG. 2, the algorithm 100 begins at step 102, wherein sensor data is collected from each of the sensors 34, 36. That is, a set of position-based output voltages or voltage measurements are taken by the sensors 34, 36 and read by the calibration module 30, e.g., using an analog-to-digital (A-to-D) converter (not shown). The values are then recorded in memory by the calibration module 30. The data may be collected by any suitable voltage measurement means. Recorded data may be represented as the measurement pair (y) of FIG. 4B, which is not required to be evenly-distributed, or even to be a full ellipse.

The algorithm 100 then proceeds to step 104, wherein an ellipse is fit to the sensor outputs as set forth below. The algorithm 100 finishes with step 106, where calibration parameters are derived from the fitted ellipse, which is used to map the recorded sensor voltage signals to the sine and cosine values. Each of these steps will now be explained in further detail with reference to FIGS. 4A and 4B.

Figures 4A, 4B:
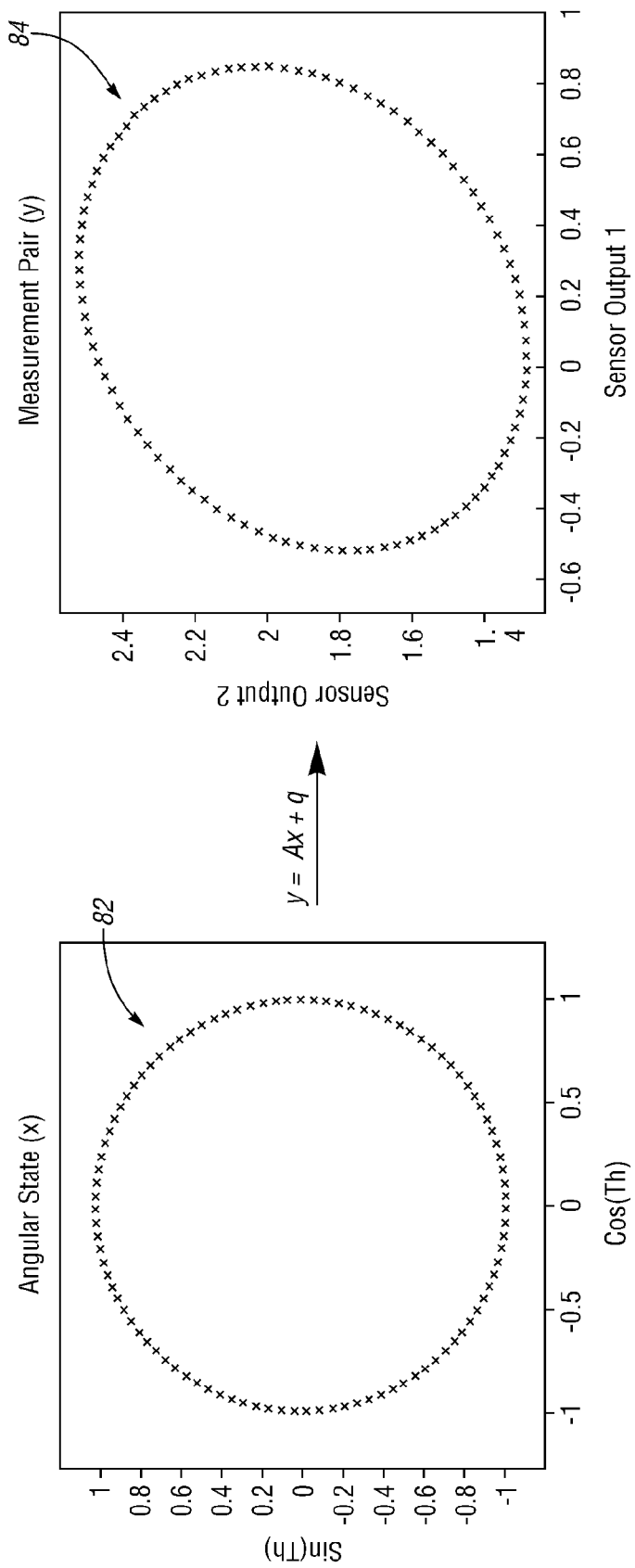
FIG. 4A is a graph describing angular data usable with the method shown in FIG. 4.
FIG. 4B is a graph describing elliptical data usable with the method described in FIG. 4.

Referring to FIGS. 4A and 4B, after step 102 of FIG. 3 is executed the algorithm 100 then executes two basic steps: (1) an automatic fit of an ellipse to the collected sensor voltages, and (2) use of an ellipse-of-best-fit to map voltages to sine/cosine pairs. The sine/cosine pair may be denoted at time t as:

$$x(t) = \begin{bmatrix} \cos\theta(t) \\ \sin\theta(t) \end{bmatrix}$$

Such data is shown as the angular state 82 in FIG. 4A. The term "measurements" as used herein refers to the output voltages of either sensor 34 or 36, as denoted by:

$$y(t) = \begin{bmatrix} v_1(t) \\ v_2(t) \end{bmatrix}$$

Such data is shown as the measurement pair (y) 84 in FIG. 4B.

From experimental data it is observed that the each measurement pair y lies on an ellipse. Step 104 of algorithm 100 finds the parameters that best parameterize this particular ellipse.

As is well understood in the art, an elliptical equation may be given by a symmetric, positive definite matrix P, a vector b, and a scalar c per the equation:

$$F(y)=y^T Py+b^T y+c=0 \quad (1)$$

Rewriting expression (1) in terms of scalars gives:

$$p_{11}y_1^2+2p_{12}y_1y_2+p_{22}y_2^2+b_1y_1+b_2y_2c=0 \quad (2)$$

Where, for instance, $p_{ij}$ represents the $i^{th}$ entry in the $j^{th}$ row of P, etc.

Given a corpus of measurement data, one may solve for P, b, and c by first defining the matrix B:

$$B = \begin{bmatrix} y_1(T)^2, & y_1(T)y_2(T), & y_2(T)^2, & y_1(T), & y_2(T), & 1 \\ y_1(T-1)^2, & y_1(T-1)y_2(T-1), & y_2(T-1)^2, & y_1(T-1), & y_2(T-1), & 1 \\ \ldots \\ y_1(0)^2, & y_1(0)y_2(0), & y_2(0)^2, & y_1(0), & y_2(0), & 1 \end{bmatrix}$$

where each row of matrix B corresponds to writing equation (2) above for a measurement y(t). For noiseless measurements, there exists a nontrivial vector u such that $\|Bu\|=0$ where:

$$u=[p_{11},2p_{12},p_{22},b_1,b_2,c]^T \quad (3)$$

In other words, for noiseless measurements there exists a P, b, and c such that equation (2) above is perfectly satisfied for each measurement. Given that measurements are corrupted by noise, we seek a non-zero vector u that minimizes $\|Bu\|$, i.e., a vector u that defines the ellipse that is best-fitted to the experimental data. The minimizing u can be found by taking the Singular Value Decomposition (SVD) of the matrix B and setting u equal to the right singular vector of B that corresponds to the smallest singular value of B. Through equation (3) above, one may then construct from u the matrix P, the vector b, and the scalar c that characterizes the ellipse-of-best-fit.

Step 106 of FIG. 3 uses a set of calibration parameters that map or relate the sine/cosine pair x to the measurement pair y. Since sine and cosine pairs are of unit length, these calibration parameters can be interpreted as the mapping of the ellipse-of-best-fit to the unit circle. To find this mapping, it is convenient to rewrite the equation for F(y) as set forth above in the form:

$$F(y)=(y-q)^T P(y-q)+e=0 \quad (4)$$

where:

$$q = -\frac{1}{2}P^{-1}b$$

and where:

$$e=c-q^T Pq.$$

Observing that sine and cosine pairs are of unit length, one may then write:

$$x^T x = 1$$
$$= -\frac{1}{e}(-e)$$
$$= -\frac{1}{e}(y-q)^T P(y-q)$$

$$= (y-q)^T\left(-\frac{1}{e}P\right)^{\frac{1}{2}}\left(-\frac{1}{e}P\right)^{\frac{1}{2}}(y-q)$$

$$= \left[\left(-\frac{1}{e}P\right)^{\frac{1}{2}}(y-q)\right]^T \left(-\frac{1}{e}P\right)^{\frac{1}{2}}(y-q)$$

where this manipulation is done by substituting in equation (4) above for e. An expression for x(t) is then given by:

$$x(t) = R\left(-\frac{1}{e}P\right)^{\frac{1}{2}}(y(t)-q) \quad (5)$$

where R is an arbitrary rotation matrix. Selecting this rotation is equivalent to defining the angular position of zero. Referring to FIG. 4B, it is found that the mapping of measurements to sine/cosine pairs, or equivalently the calibration parameters, can be written:

$$x(t)=A^{-1}(y(t)-q)$$

where from equation (5) it is found that $$A^{-1} = R\left(-\frac{1}{e}P\right)^{\frac{1}{2}}.$$

Once calibration is completed using the algorithm 100 described above, one uses the matrix A and vector q with real-time measured data, while the robot 10 of FIG. 1 or other system having the rotary device is moving, to determine the position of the system or any portion thereof. Torque control and positioning of a robotic joint may be provided using the calibrated data.

While the best modes for carrying out the invention have been described in detail, those familiar with the art to which this invention relates will recognize various alternative designs and embodiments for practicing the invention within the scope of the appended claims.

The invention claimed is:

1. A system comprising:
    a rotary device;
    a pair of rotary absolute position (RAP) sensors positioned with respect to the rotary device, and operable for generating respective encoded pairs of voltage signals describing positional data of the rotary device; and
    a host machine in communication with the pair of RAP sensors, wherein the host machine is configured to derive calibration parameters and to determine an absolute position of the rotary device using the derived calibration parameters by:
        recording a plurality of the encoded pairs of voltage signals from the RAP sensors, wherein the recorded plurality of the encoded pairs of voltage signals forms an ellipse;
        using an ellipse-of-best fit to map the ellipse of the recorded plurality of the encoded pairs of voltage signals to sine/cosine pairs;
        deriving the calibration parameters from the ellipse-of-best-fit, wherein the calibration parameters map each of the sine/cosine pairs to a respective one of the encoded pairs of voltage signals; and
        determining the absolute position of the rotary device using the derived calibration parameters.

2. The system of claim 1, wherein the calibration parameters include a matrix (A) defined as:

$$A^{-1} = R\left(-\frac{1}{e}P\right)^{\frac{1}{2}},$$

where R is an arbitrary rotation matrix, q is a centerpoint of the ellipse-of-best-fit, P is a symmetric, positive definite matrix, $e=c-q^T Pq$, and c is a scalar value.

3. The system of claim 1, wherein the system includes a humanoid robot having a robotic joint, and wherein the rotary device is a rotary portion of the robotic joint.

4. The system of claim 1, wherein the encoded pair of voltage signals includes a first voltage signal encoding the cosine of a rotary angle of the rotary device, and a second voltage signal encoding the sine of the rotary angle.

5. A calibration module configured to calibrate a pair of rotary absolute position (RAP) sensors for a system having a rotary device, wherein the pair of RAP sensors are configured to measure a rotary position of the rotary device and output encoded pairs of voltage signals describing the rotary position, the calibration module comprising:
 a host machine in communication with the RAP sensors, wherein the host machine receives the encoded pairs of voltage signals from the RAP sensors and records the received encoded pairs of voltage signals as data points forming an ellipse and is operable for deriving calibration parameters for determining an absolute position of the rotary device using the encoded pairs of voltage signals;
 wherein the host machine is configured to:
 use an ellipse-of-best fit to map the ellipse of the recorded encoded pairs of voltage signals to corresponding sine/cosine pairs;
 derive the calibration parameters from the ellipse-of-best-fit, wherein the calibration parameters relate the sine/cosine pairs to the encoded voltage signals; and
 determine the absolute position of the rotary device using the derived calibration parameters.

6. The calibration module of claim 5, wherein the calibration parameters include a matrix (A) defined as:

$$A^{-1} = R\left(-\frac{1}{e}P\right)^{\frac{1}{2}},$$

where R is an arbitrary rotation matrix, q is a centerpoint of the ellipse-of-best-fit, P is a symmetric, positive definite matrix, $e=c-q^T Pq$, and c is a scalar value.

7. The calibration module of claim 5, wherein the encoded pairs of voltage signals each include a first voltage signal encoding the cosine of a rotary angle, and a second voltage signal encoding the sine of the rotary angle.

8. The calibration module of claim 5, wherein the rotary device includes a motor.

9. A method of calibrating a pair of rotary absolute position (RAP) sensors used for measuring a rotary position of a rotary device, the method comprising:
 measuring the rotary position over time as encoded pairs of voltage signals using the pair of RAP sensors;
 recording a plurality of the encoded pairs of voltage signals as an ellipse, wherein each of the data points forming the ellipse describes a respective one of the encoded pairs of voltage signals;
 using the ellipse defined by the encoded pairs of voltage signals to calculate calibration parameters suitable for calibrating the RAP sensor using a host machine, including:
 using an ellipse-of-best fit to map the ellipse of the recorded encoded pairs of voltage signals, via a host machine, to corresponding sine/cosine pairs;
 deriving the calibration parameters from the ellipse-of-best-fit via the host machine, wherein the calibration parameters relate the sine/cosine pairs to the encoded voltage signals; and
 determining the absolute position of the rotary device using the derived calibration parameters.

10. The method of claim 9, wherein measuring the rotary position as encoded pairs of voltage signals includes transmitting a first voltage signal that encodes the cosine of a rotary angle of the rotary device, and transmitting a second voltage signal that encodes the sine of the rotary angle.

11. The method of claim 9, wherein using the ellipse-of-best includes mapping the ellipse of best fit to a unit circle defined by a plurality of the sine/cosine pairs.

12. The method of claim 9, wherein deriving the calibration parameters includes deriving a matrix (A) defined as:

$$A^{-1} = R\left(-\frac{1}{e}P\right)^{\frac{1}{2}},$$

where R is an arbitrary rotation matrix, q is a centerpoint of the ellipse-of-best-fit, P is a symmetric, positive definite matrix, $e=c-q^T Pq$, and c is a scalar value.

* * * * *